(12) United States Patent
George et al.

(10) Patent No.: US 11,256,954 B2
(45) Date of Patent: Feb. 22, 2022

(54) SYSTEM AND METHOD OF GESTURE RECOGNITION USING A RESERVOIR BASED CONVOLUTIONAL SPIKING NEURAL NETWORK

(71) Applicant: Tata Consultancy Services Limited, Mumbai (IN)

(72) Inventors: Arun George, Bangalore (IN); Dighanchal Banerjee, Kolkata (IN); Sounak Dey, Kolkata (IN); Arijit Mukherjee, Kolkata (IN)

(73) Assignee: Tala Consultancy Services Limited, Mumbai (IN)

( * ) Notice: Subject to any disclaimer, the term of this patent is extended or adjusted under 35 U.S.C. 154(b) by 0 days.

(21) Appl. No.: 17/124,584

(22) Filed: Dec. 17, 2020

(65) Prior Publication Data
US 2021/0397878 A1    Dec. 23, 2021

(30) Foreign Application Priority Data
Jun. 18, 2020  (IN) .............................. 202021025784

(51) Int. Cl.
| | | |
|---|---|---|
| G06K 9/62 | (2006.01) | |
| G06K 9/00 | (2006.01) | |
| G06N 3/04 | (2006.01) | |

(52) U.S. Cl.
CPC .......... G06K 9/623 (2013.01); G06K 9/0051 (2013.01); G06K 9/00355 (2013.01); G06N 3/049 (2013.01)

(58) Field of Classification Search
CPC ........ G06N 3/08; G06N 3/0454; G06N 20/00
See application file for complete search history.

(56) References Cited

U.S. PATENT DOCUMENTS

| | | | | |
|---|---|---|---|---|
| 6,028,626 A | * | 2/2000 | Aviv | .................. G06K 9/00771 |
| | | | | 348/152 |
| 6,236,736 B1 | * | 5/2001 | Crabtree | ............... G01S 3/7865 |
| | | | | 235/383 |

(Continued)

FOREIGN PATENT DOCUMENTS

| | | |
|---|---|---|
| CN | 109144260 A | 1/2019 |
| WO | WO2019074532 A1 | 4/2019 |

OTHER PUBLICATIONS

Panda, Priyadarshini et al., "Learning to Recognize Actions from Limited Training Examples Using a Recurrent Spiking Neural Model," *Frontiers in Neuroscience*, Oct. 2017, Publisher: Arxiv Link: https://arxiv.org/pdf/1710.07354.pdf.

*Primary Examiner* — Yosef Kassa
(74) *Attorney, Agent, or Firm* — Finnegan, Henderson, Farabow, Garrett & Dunner LLP

(57) ABSTRACT

This disclosure relates to method of identifying a gesture from a plurality of gestures using a reservoir based convolutional spiking neural network. A two-dimensional spike streams is received from neuromorphic event camera as an input. The two-dimensional spike streams associated with at least one gestures from a plurality of gestures is preprocessed to obtain plurality of spike frames. The plurality of spike frames is processed by a multi layered convolutional spiking neural network to learn plurality of spatial features from the at least one gesture. A filter block is deactivated from the plurality of filter blocks corresponds to at least one gesture which are not currently being learnt. A spatio-temporal features is obtained by allowing the spike activations from CSNN layer to flow through the reservoir. The spatial feature is classified by classifier from the CSNN layer and the spatio-temporal features from the reservoir to obtain set of prioritized gestures.

18 Claims, 7 Drawing Sheets

(56) References Cited

U.S. PATENT DOCUMENTS

| | | | |
|---|---|---|---|
| 6,701,016 B1 * | 3/2004 | Jojic | G06K 9/6206 |
| | | | 382/209 |
| 7,152,051 B1 * | 12/2006 | Commons | G06N 3/08 |
| | | | 706/16 |
| 7,280,697 B2 * | 10/2007 | Perona | G06K 9/468 |
| | | | 382/190 |
| 8,504,361 B2 * | 8/2013 | Collobert | G06F 40/284 |
| | | | 704/232 |
| 8,811,726 B2 * | 8/2014 | Belhumeur | G06K 9/00248 |
| | | | 382/159 |
| 8,942,466 B2 | 1/2015 | Petre et al. | |
| 9,015,093 B1 | 4/2015 | Commons | |
| 9,299,022 B2 | 3/2016 | Buibas et al. | |

\* cited by examiner

SYSTEM AND METHOD OF GESTURE RECOGNITION USING A RESERVOIR BASED CONVOLUTIONAL SPIKING NEURAL NETWORK

PRIORITY CLAIM

This U.S. patent application claims priority under 35 U.S.C. § 119 to: India Application No. 202021025784, filed on Jun. 18, 2020. The entire contents of the aforementioned application are incorporated herein by reference.

TECHNICAL FIELD

This disclosure relates generally to gesture recognition, and, more particularly, to system and method of gesture recognition using a reservoir based convolutional spiking neural network.

BACKGROUND

In an age of artificial intelligence, robots and drones are key enablers of task automation and they are being used in various domains such as manufacturing, healthcare, warehouses, disaster management etc. As a consequence, they often need to share work-space with and interact with human workers and thus evolving the area of research named Human Robot Interaction (HRI). Problems in this domain are mainly centered around learning and identifying of gestures/speech/intention of human coworkers along with classical problems of learning and identification of surrounding environment (and obstacles, objects etc. therein). All these essentially are needed to be done in a dynamic and noisy practical work environment. As of current state of the art vision based solutions using artificial neural networks (including deep neural networks) have high accuracy, however the models are not the most efficient solutions as learning methods and inference frameworks of the conventional deep neural networks require huge amount of training data and are typically compute and energy intensive. They are also bounded by one or more conventional architectures that leads to data transfer bottleneck between memory and processing units and related power consumption issues. Hence, this genre of solutions does not really help robots and drones to do their jobs as they are classically constrained by their battery life.

SUMMARY

Embodiments of the present disclosure present technological improvements as solutions to one or more of the above-mentioned technical problems recognized by the inventors in conventional systems. For example, in one aspect, a processor implemented method of identifying a gesture from a plurality of gestures using a reservoir based convolutional spiking neural network is provided. The processor implemented method includes at least one of: receiving, from a neuromorphic event camera, two-dimensional spike streams as an input; preprocessing, via one or more hardware processors, the address event representation (AER) record associated with at least one gestures from a plurality of gestures to obtain a plurality of spike frames; processing, by a multi layered convolutional spiking neural network, the plurality of spike frames to learn a plurality of spatial features from the at least one gesture; deactivating, via the one or more hardware processors, at least one filter block from the plurality of filter blocks corresponds to at least one gesture which are not currently being learnt; obtaining, via the one or more hardware processors, spatio-temporal features by allowing the spike activations from a CSNN layer to flow through the reservoir; and classifying, by a classifier, the at least one of spatial feature from the CSNN layer and the spatio-temporal features from the reservoir to obtain a set of prioritized gestures. In an embodiment, the two-dimensional spike streams are represented as an address event representation (AER) record. In an embodiment, each sliding convolutional window in the plurality of spike frames are connected to a neuron corresponding to a filter among plurality of filters corresponding to a filter block among plurality of filter blocks in each convolutional layer from plurality of convolutional layers. In an embodiment, the plurality of filter blocks are configured to concentrate a plurality of class-wise spatial features to the filter block for learning associated patterns based on a long-term lateral inhibition mechanism. In an embodiment, the CSNN layer is stacked to provide at least one of: (i) a low-level spatial features, (ii) a high-level spatial features, or combination thereof.

In an embodiment, the spike streams may be compressed per neuronal level by accumulating spikes at a sliding window of time, to obtain a plurality of output frames with reduced time granularity. In an embodiment, plurality of learned different spatially co-located features may be distributed on the plurality of filters from the plurality of filter blocks. In an embodiment, a special node between filters of the filter block may be configured to switch between different filters based on an associated decay constant to distribute learning of different spatially co-located features on the different filters. In an embodiment, a plurality of weights of a synapse between input and the CSNN layer may be learned using an unsupervised two trace STDP learning rule upon at least one spiking activity of the input layer. In an embodiment, the reservoir may include a sparse random cyclic connectivity which acts as a random projection of the input spikes to an expanded spatio-temporal embedding.

In another aspect, there is provided a system to identify a gesture from a plurality of gestures using a reservoir based convolutional spiking neural network. The system comprises a memory storing instructions; one or more communication interfaces; and one or more hardware processors coupled to the memory via the one or more communication interfaces. The one or more hardware processors are configured by the instructions to: receive, from a neuromorphic event camera, two-dimensional spike streams as an input; preprocess, the address event representation (AER) record associated with at least one gestures from a plurality of gestures to obtain a plurality of spike frames; process, by a multi layered convolutional spiking neural network, the plurality of spike frames to learn a plurality of spatial features from the at least one gesture; deactivate, at least one filter block from the plurality of filter blocks corresponds to at least one gesture which are not currently being learnt; obtain, spatiotemporal features by allowing the spike activations from a CSNN layer to flow through the reservoir; and classify, by a classifier, the at least one of spatial feature from the CSNN layer and the spatiotemporal features from the reservoir to obtain a set of prioritized gestures. In an embodiment, the two-dimensional spike streams is represented as an address event representation (AER) record. In an embodiment, each sliding convolutional window in the plurality of spike frames are connected to a neuron corresponding to a filter among plurality of filters corresponding to a filter block among plurality of filter blocks in each convolutional layer from plurality of convolutional layers.

In an embodiment, the plurality of filter blocks are configured to concentrate a plurality of class-wise spatial features to the filter block for learning associated patterns based on a long-term lateral inhibition mechanism. In an embodiment, the CSNN layer is stacked to provide at least one of: (i) a low-level spatial features, (ii) a high-level spatial features, or combination thereof.

In an embodiment, the spike streams may be compressed per neuronal level by accumulating spikes at a sliding window of time, to obtain a plurality of output frames with reduced time granularity. In an embodiment, plurality of learned different spatially co-located features may be distributed on the plurality of filters from the plurality of filter blocks. In an embodiment, a special node between filters of the filter block may be configured to switch between different filters based on an associated decay constant to distribute learning of different spatially co-located features on the different filters. In an embodiment, a plurality of weights of a synapse between input and the CSNN layer may be learned using an unsupervised two trace STDP learning rule upon at least one spiking activity of the input layer. In an embodiment, the reservoir may include a sparse random cyclic connectivity which acts as a random projection of the input spikes to an expanded spatio-temporal embedding.

In yet another aspect, there are provided one or more non-transitory machine readable information storage mediums comprising one or more instructions which when executed by one or more hardware processors causes at least one of: receiving, from a neuromorphic event camera, two-dimensional spike streams as an input; preprocessing, the address event representation (AER) record associated with at least one gestures from a plurality of gestures to obtain a plurality of spike frames; processing, by a multi layered convolutional spiking neural network, the plurality of spike frames to learn a plurality of spatial features from the at least one gesture; deactivating, at least one filter block from the plurality of filter blocks corresponds to at least one gesture which are not currently being learnt; obtaining, spatio-temporal features by allowing the spike activations from a CSNN layer to flow through the reservoir; and classifying, by a classifier, the at least one of spatial feature from the CSNN layer and the spatio-temporal features from the reservoir to obtain a set of prioritized gestures. In an embodiment, the two-dimensional spike streams are represented as an address event representation (AER) record. In an embodiment, each sliding convolutional window in the plurality of spike frames are connected to a neuron corresponding to a filter among plurality of filters corresponding to a filter block among plurality of filter blocks in each convolutional layer from plurality of convolutional layers. In an embodiment, the plurality of filter blocks are configured to concentrate a plurality of class-wise spatial features to the filter block for learning associated patterns based on a long-term lateral inhibition mechanism. In an embodiment, the CSNN layer is stacked to provide at least one of: (i) a low-level spatial features, (ii) a high-level spatial features, or combination thereof.

In an embodiment, the spike streams may be compressed per neuronal level by accumulating spikes at a sliding window of time, to obtain a plurality of output frames with reduced time granularity. In an embodiment, plurality of learned different spatially co-located features may be distributed on the plurality of filters from the plurality of filter blocks. In an embodiment, a special node between filters of the filter block may be configured to switch between different filters based on an associated decay constant to distribute learning of different spatially co-located features on the different filters. In an embodiment, a plurality of weights of a synapse between input and the CSNN layer may be learned using an unsupervised two trace STDP learning rule upon at least one spiking activity of the input layer. In an embodiment, the reservoir may include a sparse random cyclic connectivity which acts as a random projection of the input spikes to an expanded spatio-temporal embedding.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
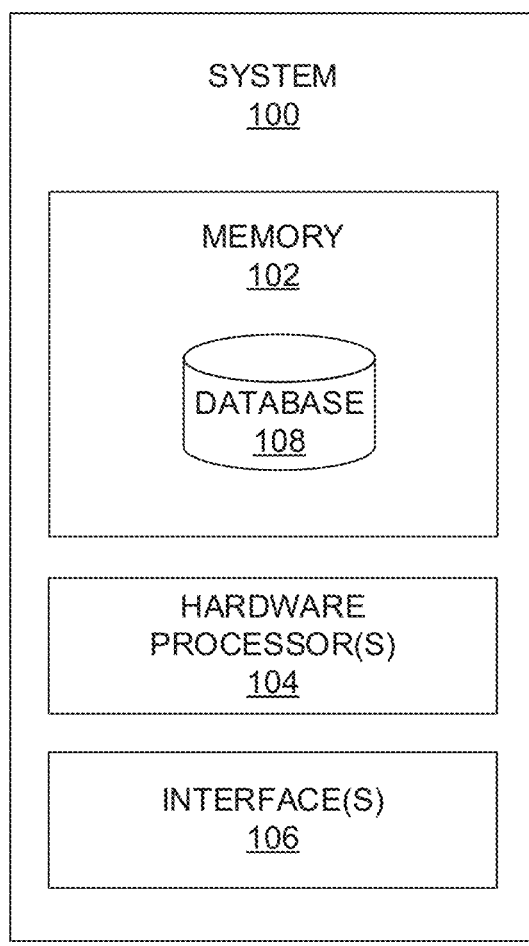
FIG. 1 illustrates a system for gesture recognition using a reservoir based convolutional spiking neural network, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments of the present disclosure propose a bio-inspired spatio-temporal learning for gesture recognition on event-based data. A plurality of input events is obtained by using a neuromorphic camera. The plurality of input events is encoded and compressed to a frame by frame sparse video representation. A plurality of spatial features is learned/captured based on a convolutional layers with each filter for a class forming a filter block, learning features from a temporal segment of the input representation of the class by an unsupervised spike time dependent plasticity (STDP) at a training time. A desired features activations (e.g., one or more spikes) from the convolutional layers are then passed to a reservoir (e.g., a Liquid State Machine (LSM)) to transform the input spikes to a spatio-temporal embedding and used as features for a classifier for classification of one or more gestures.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates a system 100 for gesture recognition using the reservoir based convolutional spiking neural network, according to some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology.

The repository, amongst other things, includes a system database and other data. The other data may include data generated as a result of the execution of one or more modules in the plurality of modules. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2A:
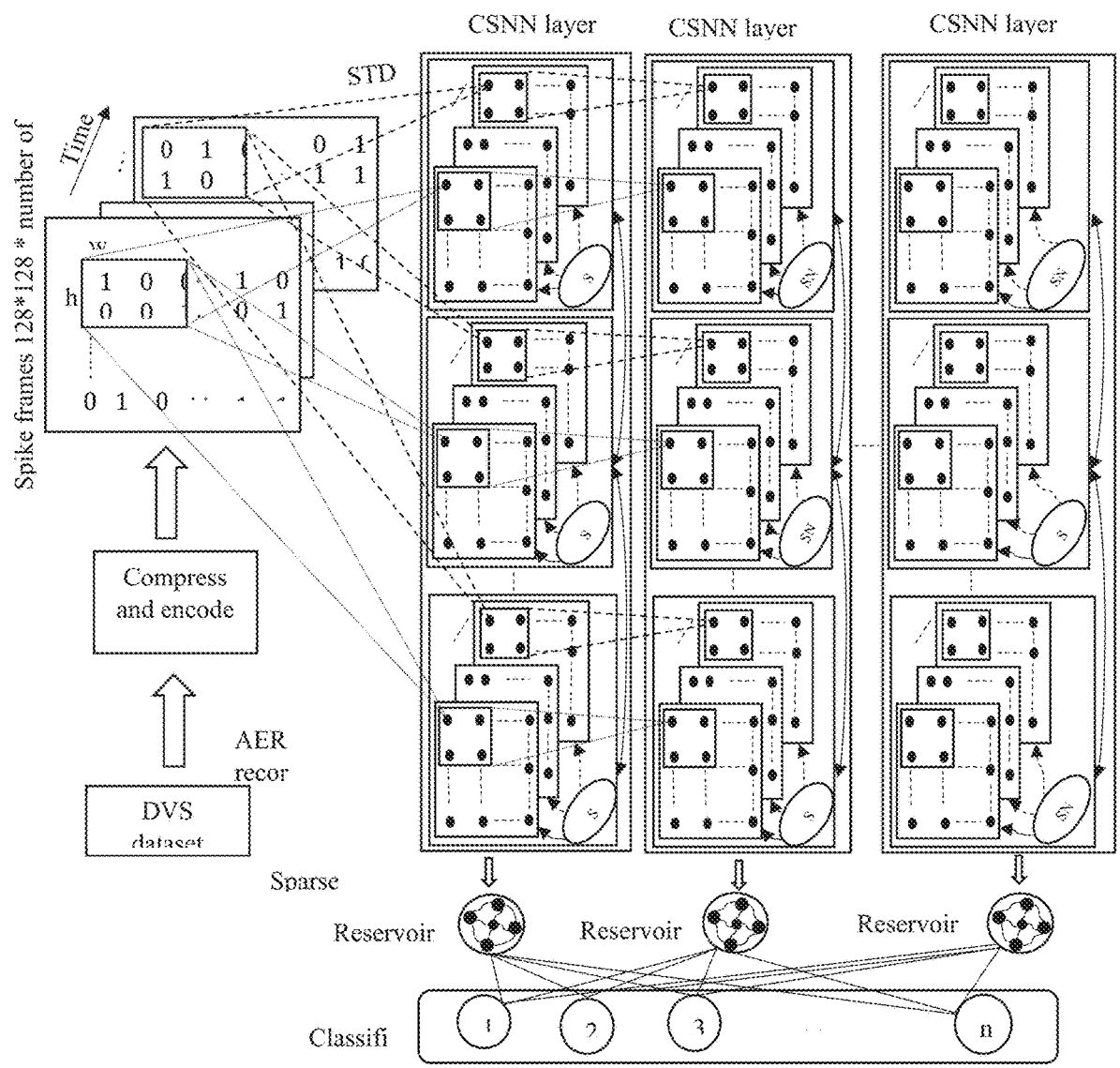
FIG. 2A illustrates an exemplary gesture recognition architecture for gesture recognition using the reservoir based convolutional spiking neural network, according to some embodiments of the present disclosure.

FIG. 2A illustrates an exemplary gesture recognition architecture 200 for gesture recognition using the reservoir based convolutional spiking neural network, according to some embodiments of the present disclosure. The gesture recognition system focuses on recognizing a human hand gesture by a robot or a drone based on a spiking neural network (SNN) computing with a convolution and a reservoir. The gesture recognition system 200 alternatively corresponds to a spiking network architecture. The spiking network architecture includes a data pre-processing layer, a convolutional spiking layer (CSNN), and a reservoir layer. An event-based camera system for capturing a visual input in a spike representation. For example, the input is taken from a neuromorphic event camera like a dynamic vision sensor (a DVS Camera) in the form of two-dimensional spike streams of resolution 128×128 represented as an AER Record (Address Event Representation). The data pre-processing layer in which a plurality of data captured by the dynamic vision sensor (DVS) or the DVS camera is stored as in the address event representation (AER) format. In an embodiment, an encoder which encodes and compresses the spike input in the AER and converts into a frame by frame sparse video representation.

In an embodiment, the SNN network takes spiking input from the dynamic vision sensor (DVS) thereby making the input data sparse. In an embodiment, one or more changes in luminosity (e.g., referred as one or more events) at a pixel is captured and are represented as quadruples [x, y, t, p] where (x, y) is the location of the pixel, t is the timestamp of occurrence of the event, and p signifies polarity of change in luminosity. In an embodiment, the AER dataset includes events at nanosecond resolution. In an embodiment, by definition each of these records are separate temporal events but a few of the events can be considered as redundant for a classification task and compress the AER dataset to some lower time resolution scale.

The data pre-processing layer in which a compression and an encoding process is performed on the data associated with the DVS in order to compute faster, while the convolutional spiking layer (CSNN), include multiple spiking layers and extracts one or more spatial features from a input spiking data. In an embodiment, the spike streams are compressed per neuronal level by accumulating spikes at a sliding window of time, to obtain a plurality of output frames with reduced time granularity.

Figure 2B:
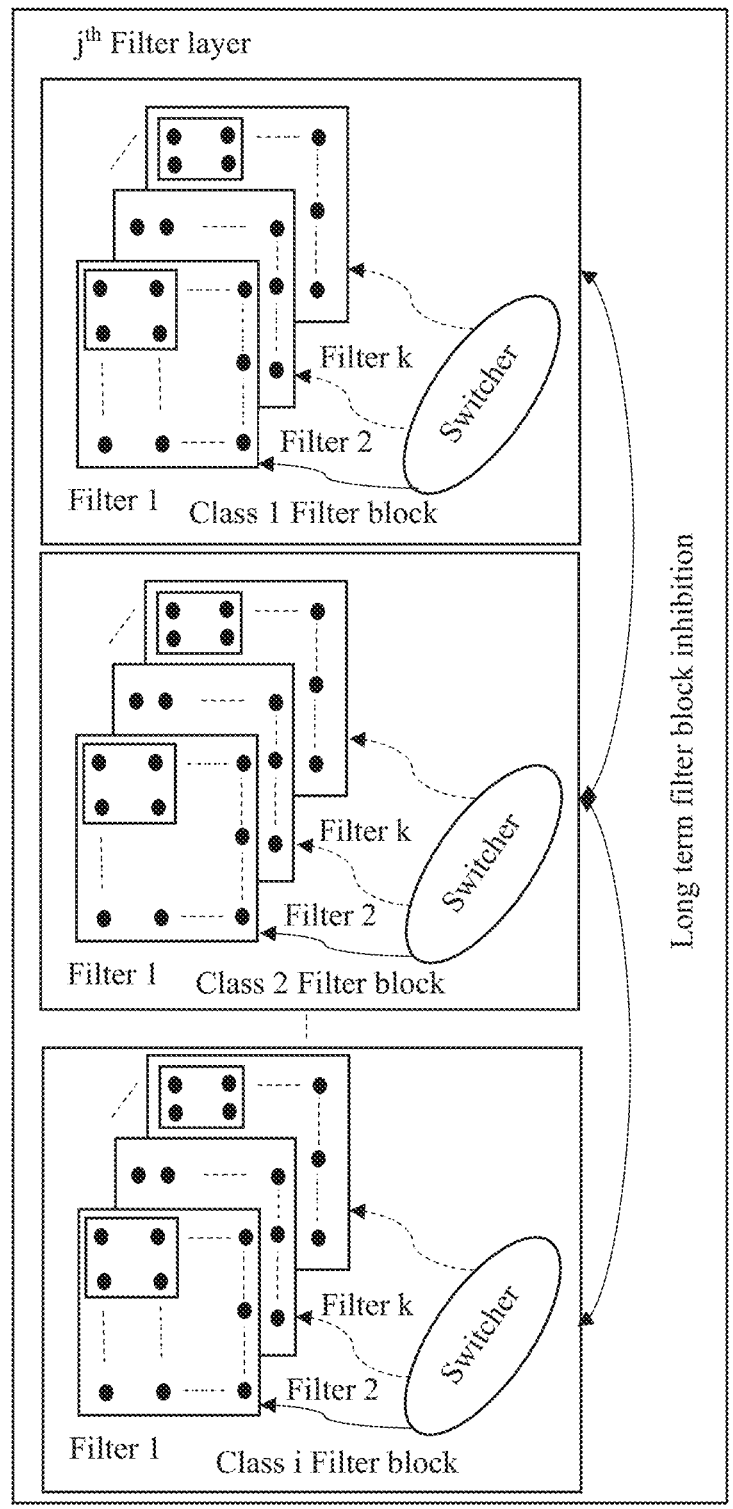
FIG. 2B illustrates an exploded view of exemplary $T^{IP}$ CSNN layer of the gesture recognition architecture for gesture recognition using the reservoir based convolutional spiking neural network, according to some embodiments of the present disclosure.

FIG. 2B illustrates an exploded view of exemplary '$j^{th}$' CSNN layer of the gesture recognition architecture 200 for the gesture recognition using the reservoir based convolutional spiking neural network, according to some embodiments of the present disclosure. The one or more spike frames are processed by a multi layered convolutional spiking neural network to learn one or more spatial features from at least one gesture or action. In an embodiment, each sliding convolutional window in the one or more spike frames are connected to a neuron corresponding to a filter among plurality of filters corresponding to a filter block among one or more filter blocks in each convolutional layer from one or more convolutional layers. In an embodiment, the filter blocks concentrate class-wise spatial features to a filter block for learning associated patterns with help of a long-term lateral inhibition mechanism. An at least one filter block is deactivated from a plurality of filter blocks corresponds to at least one gesture which are not currently being learnt. In an embodiment, the plurality of filter blocks is configured to concentrate a plurality of class-wise spatial features to the filter block for learning associated patterns based on a long-term lateral inhibition mechanism.

In an embodiment, between filters of the filter block, a special node switches between different filters according to an associated decay constant which distributes learning of different spatially co-located features on different filters. In an embodiment, one or more weights of a synapse between an input and the CSNN layer are learned according to the spiking activity of the input layer using unsupervised two trace STDP learning rule. A spatio-temporal features is obtained by allowing the spike activations from a CSNN layer to flow through the reservoir. In an embodiment, the CSNN layer is stacked to provide at least one of: (i) a low-level spatial features, (ii) a high-level spatial features, or combination thereof. In an embodiment, the reservoir includes a sparse random cyclic connectivity, which acts as a random projection of the input spikes to an expanded spatio-temporal embedding. The at least one of spatial feature is classified by a classifier (e.g., a logistic regression) from the CSNN layer and the spatio-temporal features from the reservoir to obtain a set of prioritized gestures.

In an embodiment, the spatial feature extraction is hierarchical in nature, with first layers capturing one or more low level features like edges with complexity keep on increasing till last layer. The reservoir layer helps to extract the temporal aspects of the feature from the convolutional layer. The convolutional features of a layer along with associated one or more reservoir features form as an enriched feature set, which is then passed to a classifier for recognizing the gestures.

Figure 3:
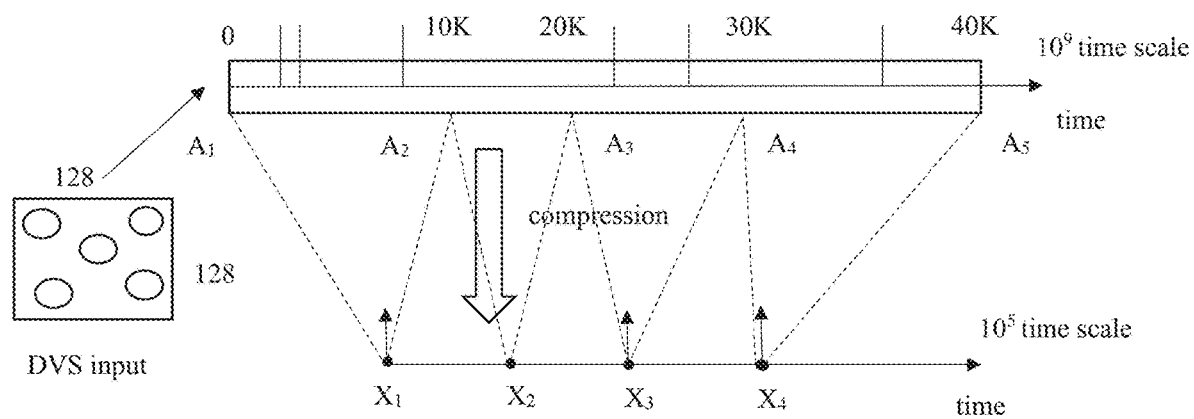
FIG. 3 illustrates an exemplary compression technique for the gesture recognition, according to some embodiments of the present disclosure.

FIG. 3 illustrates an exemplary compression technique for the gesture recognition, according to some embodiments of the present disclosure. In an embodiment, within equally distributed time window of length 10000 between $A_i$ and $A_{i+1}$, if multiple events or spikes occurred at a particular pixel, after compression, considered to be a single spike occurring at xi if the time axis is scaled down by a factor of $10^4$. In an embodiment, the DVS dataset is captured in a resolution of 128×128 and once the compression is performed, the AER records are converted to multiple spike-frames of size 128×128, with each pixel having values 1 or 0 only. The DVS dataset is captured with no significant information is lost by incorporating the compression mechanism and beneficial in terms of faster processing time and less data handling.

The convolutional spiking layer includes a class-wise filter blocks along with a lateral inhibition-based competition mechanism between the one or more filter blocks. The output from the data pre-processing layer acts as the input to the convolutional spiking layer. In an embodiment, there are one or more convolutional layers in the neural network architecture. In an embodiment, connectivity from input to the convolutional layer as well as from one convolutional layer to the next is same as that of a CNN based network. In an embodiment, a class wise filter block includes multiple filters which helps to capture spatially co-located patterns within the spike-frames of a single gesture class.

In an embodiment, each spike frame of a gesture is connected to the one or more convolutional layers via a sliding window-based connectivity. For example, initially a same sized sliding window with dimensions w*h pixels is chosen within the input spike frame is taken. The input pixels belonging to the sliding window is connected to a single neuron of a filter block in a first convolutional layer. For a second neuron in the same filter block of the convolutional layer, the initial window is slided horizontally by a stride and each pixel in a new shifted window is connected to the second neuron. This process is repeated horizontally and then vertically till the entire spike-frame is connected to all the neurons on the filter of the convolutional layer. In an embodiment, as more spike-frames come over time, similar sliding mechanism connects those frames with same neurons in the same filter. In an embodiment, the second and other consecutive layers can be connected to previous convolutional layers in the same fashion, upon the first convolutional layer is connected to the input. In an embodiment, number of convolutional layers is a design choice, to be set according to the complexity of a spatial features present in the dataset.

In an embodiment, instead of learning a 3D filter (spatial and temporal) from consecutive spike-frames, the proposed approach uses a switching mechanism. In an embodiment, a convolutional spiking neural network architecture built for extraction of two dimensional (2D) spatial features from sparse videos without overlap and the architecture involves a switching mechanism for achieving the 2D spatial feature extraction without overlap. In an embodiment, only one filter is activated among the filters of the same filter block at a particular time window. In an embodiment, selection is performed by a special LIF neuron node, called a switcher node, at periodic intervals. By applying inhibition, the switcher node makes all other filters to remain inactive for 'some' time steps, except the next filter in the block. In an embodiment, this duration of inactivation is entirely depending upon strength of inhibition applied by the switcher node and this strength is a configurable parameter. After the inactivity stage, all filters start to compete again and only one which spikes the most is chosen as a dominant. In an embodiment, this process is repeated during the training time of convolutional filters based on a decay time constant of the switcher node. The switcher node ensures that all filters obtain a chance during the training phase and that spatially co-located but temporally separable features appear on different filters without getting mixed up. This is essential for one or more spiking neurons to learn one or more overlapping features. In an embodiment, the forced inhibition and the selection mechanism is applicable to one or more spiking neurons only to ensure that some of them learn a particular feature, unlike ANNs, where neurons are selected to learn by a global error reducing mechanism like a backpropagation.

In an embodiment, another level of long-term inhibition between the class-wise filter blocks which ensures that during training phase, only one of the filter blocks is active at a given point of time for a given gesture class and thereby not allowing one or more multiple filter blocks to learn same redundant pattern. In an embodiment, the lateral inhibition among the filter blocks allows other filter blocks to compete for classes. In an embodiment, one or more weights in the filter blocks are initialized randomly and one of those filter blocks wins for the first time for a particular gesture class and ensuring that spike maximally only for that particular class during the later part of training. Once a filter block wins due to maximum initial spiking, an inhibition signal of higher strength is sent to other filter blocks, preventing them from being activated.

In an embodiment, a switching periodicity is dependent on the total time associated with at least one gesture and different spatial patterns present in the gesture. In an embodiment, the switching periodicity for that particular filter block can be set to a small value, if multiple repetitive patterns occur within a short duration. For example, a hand waving gesture repeats patterns more frequent than a right-hand rotation gesture and so for the filter block learning hand waving, the switching periodicity is set smaller compared to that of the hand rotation gesture. In an embodiment, an optimal switching periodicity for a right-hand wave is found to be 10 ms (by parameter tuning) whereas for a right hand clockwise rotation, the optimal value is 62 ms. In an embodiment, during testing time, both long term inhibition between the filter block as well as switching of the filters within a block are removed as they are useful during training only.

The reservoir layer where spiking activity of each of the CSNN layer (i.e. the spatial features present within the gesture) is forwarded to one reservoir each. The temporal components of the gestures are captured explicitly by the spiking behaviour of recurrently connected sparse reservoir. In an embodiment, the reservoir is a recurrent neural network where instead of training the recurrent connections, a population of neurons with cyclic connections and random sparse connectivity is constructed. In an embodiment, the reservoir is a form of Liquid State Machine (LSM) which convert one or more spikes from the convolutional layer to one or more spatio-temporal features. In another embodiment, the reservoir is a form of an Echo state Networks (ESN). In an embodiment, the CSNN layer is stacked to provide at least one of: (i) a low-level spatial features, (ii) a high-level spatial features, or combination thereof. In an embodiment, the low level or the high-level spatial features fed into the reservoir for converting into the spatio temporal features at each level.

The output spikes of the reservoir capture higher dimensional embedding of the spatio-temporal features present in the data. The output from the reservoir is connected to a readout layer of the neurons and the synaptic weights between the reservoir and the readout layer are modified to get the desired classification. In an embodiment, connectivity from the one or more convolutional filter blocks to the reservoir is taken as a sparse connection with one or more random weights. In an embodiment, an amount of sparsity is a hyper parameter and can be tuned for an optimal performance. A weight matrix of the reservoir is constructed as a random sample from uniform distribution with a specific density (i.e., 0.2). A reservoir weight matrix is constructed ensuring that associated spectral radius, i.e., a largest absolute eigenvalue is less than unity. In an embodiment, one or more neurons in the reservoir acts as inhibitory as well as excitatory. In an embodiment, ratio of the excitatory to the inhibitory is an important parameter to consider while designing the reservoirs.

Figure 4A:
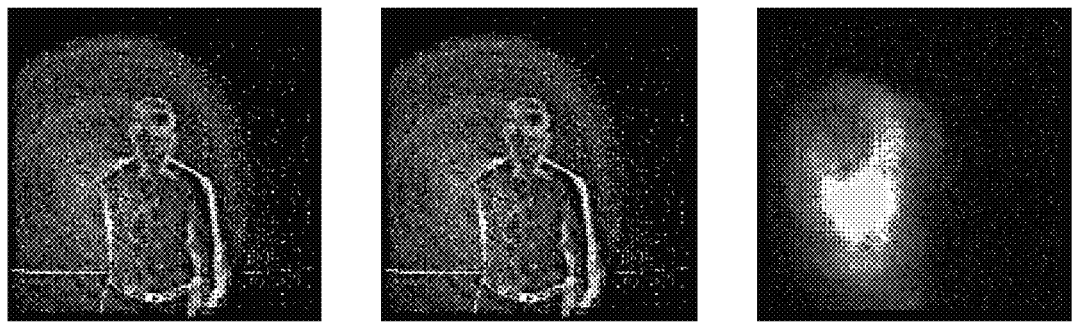
FIGS. 4A, 4B, and 4C are exemplary simulated representations illustrating a comparison between an input, a compressed input, and an accumulated feature map of a filter layer of a filter block for gesture recognition, according to some embodiments of the present disclosure.
Figure 4B:
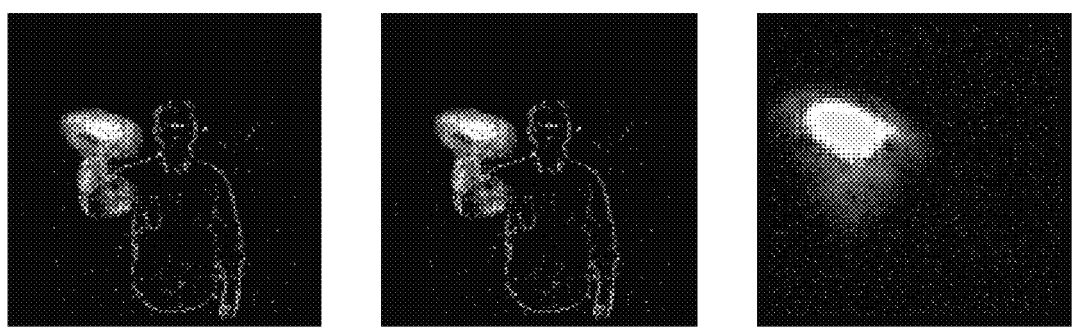
Figure 4C:
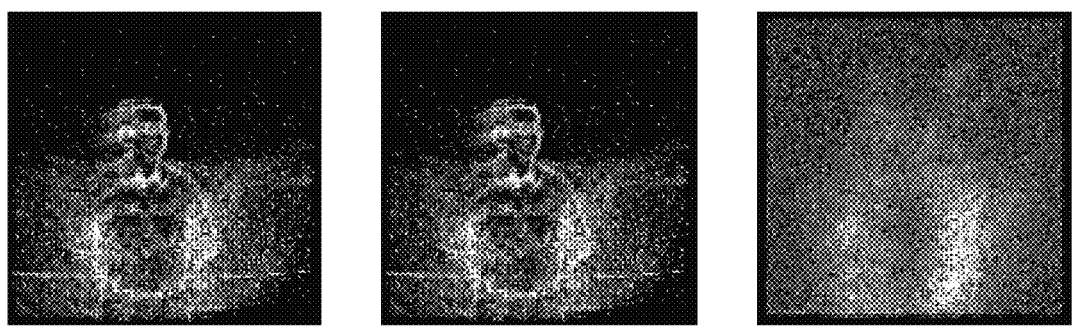

FIGS. 4A-4C are exemplary simulated representations illustrating a comparison between an input, a compressed input, and an accumulated feature map of a filter layer of a filter block for gesture recognition, according to some embodiments of the present disclosure.

Example Scenario:

In an example scenario, the disclosed system, for example the system or architecture 200 (of FIGS. 2A and 2B) was trained for performing gesture recognition for actions of a target, such as a human being. For the purpose of example and experimentation, the spiking neural network is trained and tested on an example DVS gesture data set and the data set include a set of 11 hand and arm gestures of 29 people under three different lighting conditions captured using a DVS128 camera. Each trial includes one person performing all 11 gestures sequentially in front of a static background. The gesture set includes hand waving (both arms), arm rotations (both arms, clockwise and counter-clockwise), arm rolling, hand clapping, playing guitar or drums in the air and some "other gestures" performed by that particular person. A three lighting conditions are combinations of a natural light, a fluorescent, and LED lights, which were selected to control the effect of shadows and flicker noise from fluorescent lights on the DVS128. Each gesture may last for about 6 seconds. To evaluate classifier performance, out of total 29 persons' data, 23 were marked as the training set and the remaining 6 were kept for testing.

Table I below summarizes the parameters used for implementation of the neuron model and learning mechanism.

TABLE I

| Parameter | Value | Parameter | Value |
|---|---|---|---|
| $V_{thresh\text{-}static}$ | −15.0 mV | $V_{rest}$ | −65.0 mV |
| $\tau$ | 100 ms | $\tau\theta$ | $10^7$ ms |
| $\tau_{pre}$ | 20 ms | $\tau_{post}$ | 20 ms |
| $\eta_{dep}$ | $10^{-3}$ | $\eta_{pot}$ | $10^{-2}$ |

Many of these parameters are consistent with the values of their biological counterparts. The threshold voltage of neurons $V_{thresh\text{-}static}$ is set at a comparatively high value to reduce spikes due to random noise.

FIGS. 4A-4C shows the comparison between input, compressed input and the accumulated feature map of the filter layer of the filter block over the entire simulation time. First two rows show spatially overlapping classes namely right-hand clockwise rotation and right hand wave while the third row represent one example from other gesture class. In the learnt feature map, only key regions where the hand motion occurs are being learnt and less significant details like the features of the person who does the gesture are treated as noise and are not learnt. Experiments were conducted to determine accuracy of the proposed approach with one or more hyper parameters and the results are provided in Table II.

The experiments were conducted with a convolutional spiking layer connected to a reservoir.

TABLE II

| Experiment | No. of filters | Window size (h, w) | stride | Reservoir size | Training accuracy | All class test accuracy | 8 class test accuracy | Total no. of parameters | Active params at each time step | Efficiency ratio | Top 3 accuracy |
|---|---|---|---|---|---|---|---|---|---|---|---|
| E1 | 11 | (20, 20) | 9 | 8000 | 72.8 | 59.2 | 88.3 | 0.8316M | 0.1556M | 0.711 | 95.51 |
| E2 | 11 | (6, 6) | 2 | 12000 | 82.5 | 58.7 | 88.1 | 1.6542M | 0.2703M | 0.354 | 94.68 |
| E3 | 22 | (20, 20) | 9 | 8000 | 73.8 | 63.2 | 86.5 | 1.5752M | 0.2232M | 0.401 | 90.03 |
| E4 | 22 | (6, 6) | 2 | 12000 | 81.6 | 65.0 | 89.5 | 3.1764M | 0.4087M | 0.205 | 95.12 |

Figure 5:
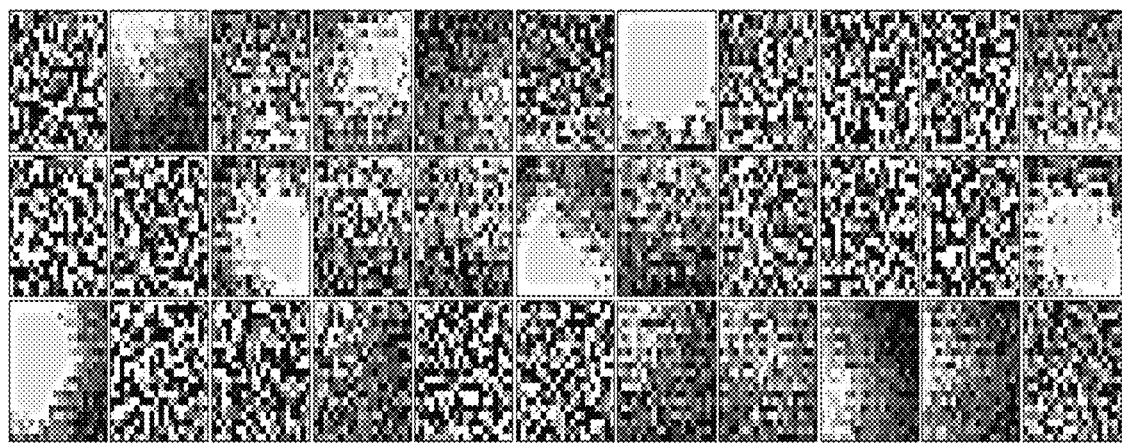
FIG. 5 is an exemplary simulated representation illustrating one or more neuronal activities in the CSNN filters, according to some embodiments of the present disclosure.

FIG. 5 is an exemplary simulated representation illustrating one or more neuronal activities in the CSNN filters, according to some embodiments of the present disclosure. The spatial patterns learnt by corresponding neurons on different filter blocks are visualized. Each square block shows a 20*20 pattern learnt by a randomly chosen single neuron from the filter block. Three rows are shown in the figure, which represent learning by three such neurons from three different spatial positions of the filter block. Each column represents the pattern learnt by the corresponding neuron for a given class and there are 11 such columns. The patterns learnt are sparse and varied according to their spatial positions.

Figure 6:
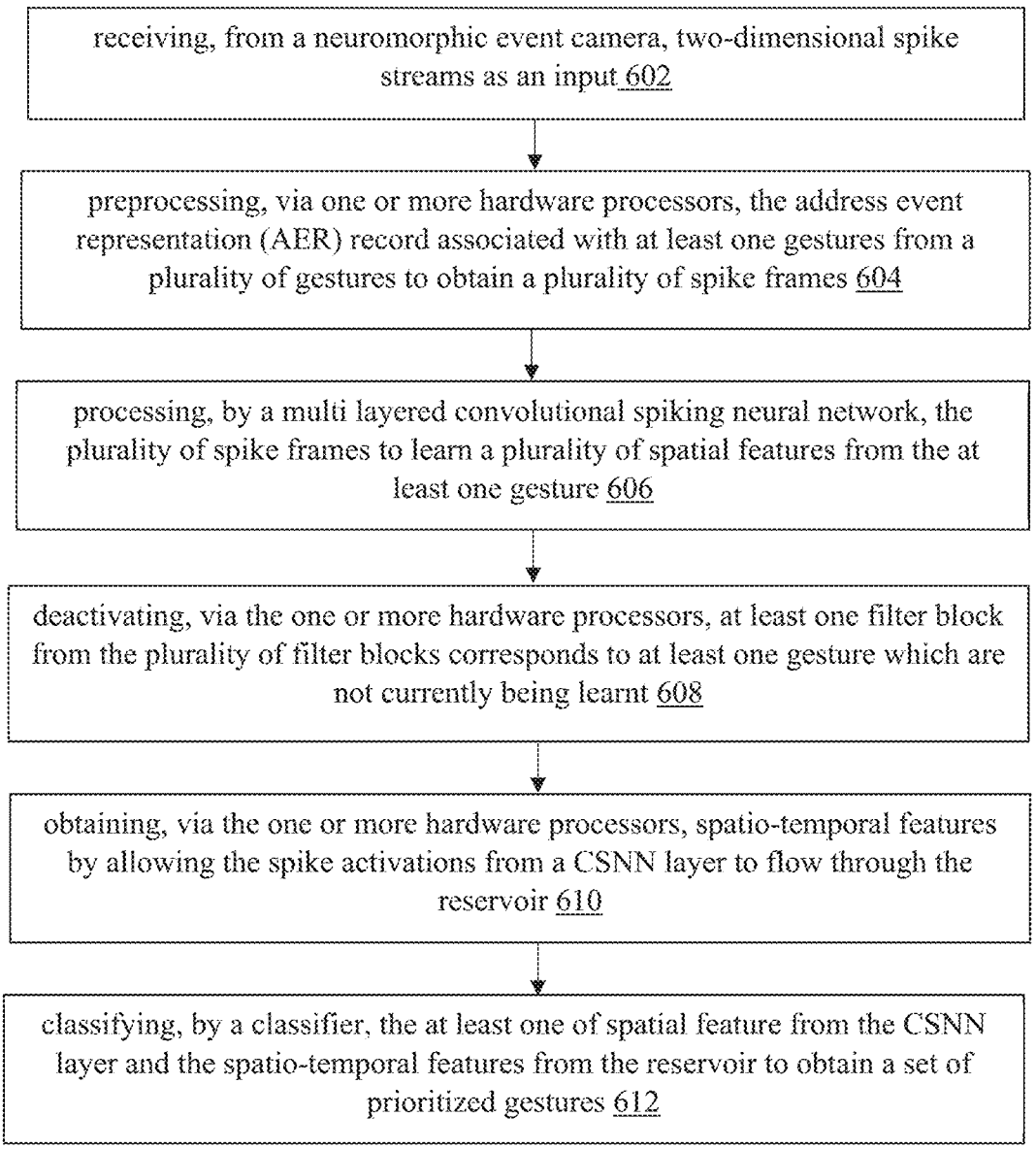
FIG. 6 is an exemplary flow diagram illustrating a method of identifying a gesture from a plurality of gestures using a reservoir based convolutional spiking neural network, according to some embodiments of the present disclosure.

FIG. 6 is an exemplary flow diagram illustrating a method of identifying a gesture from the plurality of gestures using the reservoir based convolutional spiking neural network, according to some embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system as depicted in FIGS. 1 and 2A.

At step 602, two-dimensional spike streams is received from a neuromorphic event camera as an input. In an embodiment, the two-dimensional spike streams are represented as an address event representation (AER) record. At step 604, the address event representation (AER) record associated with at least one gestures from a plurality of gestures is preprocessed to obtain a plurality of spike frames. At step 606, the plurality of spike frames is processed by a multi layered convolutional spiking neural network to learn a plurality of spatial features from the at least one gesture. In an embodiment, each sliding convolutional window in the plurality of spike frames are connected to a neuron corresponding to a filter among plurality of filters corresponding to a filter block among plurality of filter blocks in each convolutional layer from plurality of convolutional layers. At step 608, at least one filter block is deactivated from the plurality of filter blocks corresponds to at least one gesture which are not currently being learnt. In an embodiment, the plurality of filter blocks are configured to concentrate a plurality of class-wise spatial features to the filter block for learning associated patterns based on a long-term lateral inhibition mechanism. At step 610, spatio-temporal features is obtained by allowing the spike activations from a CSNN layer to flow through the reservoir. In an embodiment, the CSNN layer is stacked to provide at least one of: (i) a low-level spatial features, (ii) a high-level spatial features, or combination thereof. At step 612, the at least one of spatial feature is classified by a classifier from the CSNN layer and the spatio-temporal features from the reservoir to obtain a set of prioritized gestures.

In an embodiment, the spike streams may be compressed per neuronal level by accumulating spikes at a sliding window of time, to obtain a plurality of output frames with reduced time granularity. In an embodiment, plurality of learned different spatially co-located features may be distributed on the plurality of filters from the plurality of filter blocks. In an embodiment, a special node between filters of the filter block may be configured to switch between different filters based on an associated decay constant to distribute learning of different spatially co-located features on the different filters. In an embodiment, a plurality of weights of a synapse between input and the CSNN layer may be learned using an unsupervised two trace STDP learning rule upon at least one spiking activity of the input layer. In an embodiment, the reservoir may include a sparse random cyclic connectivity which acts as a random projection of the input spikes to an expanded spatio-temporal embedding.

The embodiments of the present disclosure utilize a bio-plausible spiking neurons for gesture/action recognition. The embodiments of the present disclosure capture a spatial-temporal features of an action/gesture from video in an unsupervised manner i.e., using SNN in an efficient manner. The embodiments of the present disclosure are capable of processing visual input from an event-based camera (just like the human brain process the spikes captured through the human eyes). The embodiments of the present disclosure in which the compression of input streams results in a reduced computation for the gesture detection by reducing the number of spikes to process. Further, the compression also results in a lower temporal granularity (e.g., from a nanosecond timescale to a microsecond) so that running of spiking neurons can happen faster. There is no information loss in spatial dimensions and the loss of spikes results in removal of very fast irrelevant noise from the input data.

The embodiments of the present disclosure utilize biological models of neurons (e.g., spiking neurons) and the bio-plausible learning mechanisms (e.g., STDP instead of Backpropagation in case of ANN). The embodiments of the present disclosure include time-based switching of filters according to classes/actions for learning 2D representations for video. The convolutional spiking neural network is learning based on unsupervised learning algorithm and the gesture recognition system utilizes a convolutional spiking architecture. The embodiments of the present disclosure in which the liquid state machines along with the convolutional layer is utilized so that both the spatial and the temporal features can be extracted.

The embodiments of the present disclosure in which the filter block wise inhibition mechanism include benefits such as: (a) since all of the filter blocks are not active at a time, which reduces the number of active convolutional neurons of a CSNN layer during training time for each gesture, (b) enables to set different periodicity (i.e. different decay time constant) for the switcher nodes of different filter blocks according to associated gesture. The embodiments of the present disclosure can be extended to experiment with layers, parameter values and different connection patterns in order to enhance the accuracy for spatially overlapping classes. The embodiments of the present disclosure can be extended to replace the input DVS data set with live feed from the DVS camera so that the network can learn and classify in real time.

The embodiments of the present disclosure are capable of running in a neuromorphic chip with low power and computational requirements capable of getting deployed at edge. The embodiments of the present disclosure allow a robot to learn gestures quickly by consuming very low power. The embodiments of the present disclosure in which the SNN of the gesture recognition system is trained on a DVS gesture data set and obtained an accuracy of 89% over eight spatially nonoverlapping classes and 65% accuracy on all eleven gesture classes therein. The trained model uses much lesser number of parameters for learning and ratio of test accuracy & number of parameters is much less compared to existing approaches.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of identifying a gesture from a plurality of gestures using a reservoir based convolutional spiking neural network, comprising:
   receiving, from a neuromorphic event camera, two-dimensional spike streams as an input, wherein the two-dimensional spike streams are represented as an address event representation (AER) record;
   preprocessing, via one or more hardware processors, the address event representation (AER) record associated with at least one gestures from a plurality of gestures to obtain a plurality of spike frames;
   processing, by a multi layered convolutional spiking neural network, the plurality of spike frames to learn a plurality of spatial features from the at least one gesture, wherein each sliding convolutional window in the plurality of spike frames are connected to a neuron corresponding to a filter among plurality of filters corresponding to a filter block among plurality of filter blocks in each convolutional layer from plurality of convolutional layers;
   deactivating, via the one or more hardware processors, at least one filter block from the plurality of filter blocks corresponds to at least one gesture which are not currently being learnt, wherein the plurality of filter blocks are configured to concentrate a plurality of class-wise spatial features to the filter block for learning associated patterns based on a long-term lateral inhibition mechanism;
   obtaining, via the one or more hardware processors, spatio-temporal features by allowing the spike activations from a CSNN layer to flow through the reservoir, wherein the CSNN layer is stacked to provide at least one of: (i) a low-level spatial features, (ii) a high-level spatial features, or combination thereof; and
   classifying, by a classifier, the at least one of spatial feature from the CSNN layer and the spatio-temporal features from the reservoir to obtain a set of prioritized gestures.

2. The processor implemented method of claim 1, wherein the spike streams are compressed per neuronal level by accumulating spikes at a sliding window of time, to obtain a plurality of output frames with reduced time granularity.

3. The processor implemented method of claim 1, wherein a plurality of learned different spatially co-located features are distributed on the plurality of filters from the plurality of filter blocks.

4. The processor implemented method of claim 1, wherein a special node between filters of the filter block is configured to switch between different filters based on an associated decay constant to distribute learning of different spatially co-located features on the different filters.

5. The processor implemented method of claim 1, wherein a plurality of weights of a synapse between input and the CSNN layer are learned using an unsupervised two trace STDP learning rule upon at least one spiking activity of the input layer.

6. The processor implemented method of claim 1, wherein the reservoir comprises a sparse random cyclic connectivity which acts as a random projection of the input spikes to an expanded spatio-temporal embedding.

7. A system (100) to identify a gesture from a plurality of gestures using a reservoir based convolutional spiking neural network, comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
receive, from a neuromorphic event camera, two-dimensional spike streams as an input, wherein the two-dimensional spike streams are represented as an address event representation (AER) record;
preprocess, the address event representation (AER) record associated with at least one gestures from a plurality of gestures to obtain a plurality of spike frames;
process, by a multi layered convolutional spiking neural network, the plurality of spike frames to learn a plurality of spatial features from the at least one gesture, wherein each sliding convolutional window in the plurality of spike frames are connected to a neuron corresponding to a filter among plurality of filters corresponding to a filter block among plurality of filter blocks in each convolutional layer from plurality of convolutional layers;
deactivate, at least one filter block from the plurality of filter blocks corresponds to at least one gesture which are not currently being learnt, wherein the plurality of filter blocks are configured to concentrate a plurality of class-wise spatial features to the filter block for learning associated patterns based on a long-term lateral inhibition mechanism;
obtain, spatiotemporal features by allowing the spike activations from a CSNN layer to flow through the reservoir, wherein the CSNN layer is stacked to provide at least one of: (i) a low-level spatial features, (ii) a high-level spatial features, or combination thereof; and
classify, by a classifier, the at least one of spatial feature from the CSNN layer and the spatiotemporal features from the reservoir to obtain a set of prioritized gestures.

8. The system (100) of claim 7, wherein the spike streams are compressed per neuronal level by accumulating spikes at a sliding window of time, to obtain a plurality of output frames with reduced time granularity.

9. The system (100) of claim 7, wherein plurality of learned different spatially co-located features are distributed on the plurality of filters from the plurality of filter blocks.

10. The system (100) of claim 7, wherein a special node between filters of the filter block is configured to switch between different filters based on an associated decay constant to distribute learning of different spatially co-located features on the different filters.

11. The system (100) of claim 7, wherein a plurality of weights of a synapse between input and the CSNN layer are learned using an unsupervised two trace STDP learning rule upon at least one spiking activity of the input layer.

12. The system (100) of claim 7, wherein the reservoir comprises a sparse random cyclic connectivity which acts as a random projection of the input spikes to an expanded spatio-temporal embedding.

13. One or more non-transitory machine-readable information storage mediums comprising one or more instructions which when executed by one or more hardware processors perform actions comprising:
receiving, from a neuromorphic event camera, two-dimensional spike streams as an input, wherein the two-dimensional spike streams are represented as an address event representation (AER) record;
preprocessing, the address event representation (AER) record associated with at least one gestures from a plurality of gestures to obtain a plurality of spike frames;
processing, by a multi layered convolutional spiking neural network, the plurality of spike frames to learn a plurality of spatial features from the at least one gesture, wherein each sliding convolutional window in the plurality of spike frames are connected to a neuron corresponding to a filter among plurality of filters corresponding to a filter block among plurality of filter blocks in each convolutional layer from plurality of convolutional layers;
deactivating, at least one filter block from the plurality of filter blocks corresponds to at least one gesture which are not currently being learnt, wherein the plurality of filter blocks are configured to concentrate a plurality of class-wise spatial features to the filter block for learning associated patterns based on a long-term lateral inhibition mechanism;
obtaining, spatio-temporal features by allowing the spike activations from a CSNN layer to flow through the reservoir, wherein the CSNN layer is stacked to provide at least one of: (i) a low-level spatial features, (ii) a high-level spatial features, or combination thereof; and
classifying, by a classifier, the at least one of spatial feature from the CSNN layer and the spatio-temporal features from the reservoir to obtain a set of prioritized gestures.

14. The one or more non-transitory machine-readable information storage mediums of claim 13, wherein the spike streams are compressed per neuronal level by accumulating spikes at a sliding window of time, to obtain a plurality of output frames with reduced time granularity.

15. The one or more non-transitory machine-readable information storage mediums of claim 13, wherein a plurality of learned different spatially co-located features are distributed on the plurality of filters from the plurality of filter blocks.

16. The one or more non-transitory machine-readable information storage mediums of claim 13, wherein a special node between filters of the filter block is configured to switch between different filters based on an associated decay constant to distribute learning of different spatially co-located features on the different filters.

17. The one or more non-transitory machine-readable information storage mediums of claim 13, wherein a plurality of weights of a synapse between input and the CSNN layer are learned using an unsupervised two trace STDP learning rule upon at least one spiking activity of the input layer.

18. The one or more non-transitory machine-readable information storage mediums of claim 13, wherein the reservoir comprises a sparse random cyclic connectivity which acts as a random projection of the input spikes to an expanded spatio-temporal embedding.

\* \* \* \* \*